United States Patent [19]

Suchacz

[11] Patent Number: 5,458,758
[45] Date of Patent: Oct. 17, 1995

[54] FLUID IONIZER

[76] Inventor: Wojciech Suchacz, 44 Locust Ave., North Providence, R.I. 02911

[21] Appl. No.: 265,820

[22] Filed: Jun. 27, 1994

[51] Int. Cl.⁶ ........................................................ C02F 1/46
[52] U.S. Cl. ............................ 204/272; 204/275; 204/302
[58] Field of Search ..................................... 204/302, 305, 204/149, 272, 275

[56] References Cited

U.S. PATENT DOCUMENTS

| | | | |
|---|---|---|---|
| 3,519,550 | 7/1970 | Winslow, Jr. et al. | 204/305 |
| 3,758,399 | 9/1973 | Pendergrass | 204/228 |
| 4,341,617 | 7/1982 | King | 204/302 |
| 5,061,376 | 10/1991 | MacGregor | 210/748 |
| 5,149,422 | 9/1992 | Barrington | 210/85 |
| 5,234,555 | 8/1993 | Ibbott | 204/150 |

Primary Examiner—John Niebling
Assistant Examiner—William T. Leader

[57] ABSTRACT

Disclosed is a new fluid ionizer for use within a dielectric conduit through which a fluid containing particulate impurities is flowing. The ionizer causes the impurities to cluster together to form larger particles which may be more easily filtered by subsequent processes. The fluid ionizer comprises a hollow electrically grounded first electrode disposed within the conduit and through which fluid flowing in the conduit also flows. A second electrode, coaxially positioned within the first electrode, has a plurality of pointed prongs projecting laterally therefrom to define an ionizing comb. The fluid flows amongst the prongs of the ionizing comb. The second electrode is negatively charged with a high frequency series of high voltage pulses whereby the second electrode, and more particularly the points of the ionizing comb, imparts a negative charge to some of the particles. The negatively charged particles attract the remaining naturally positively charged particles to form clusters of particles.

1 Claim, 4 Drawing Sheets

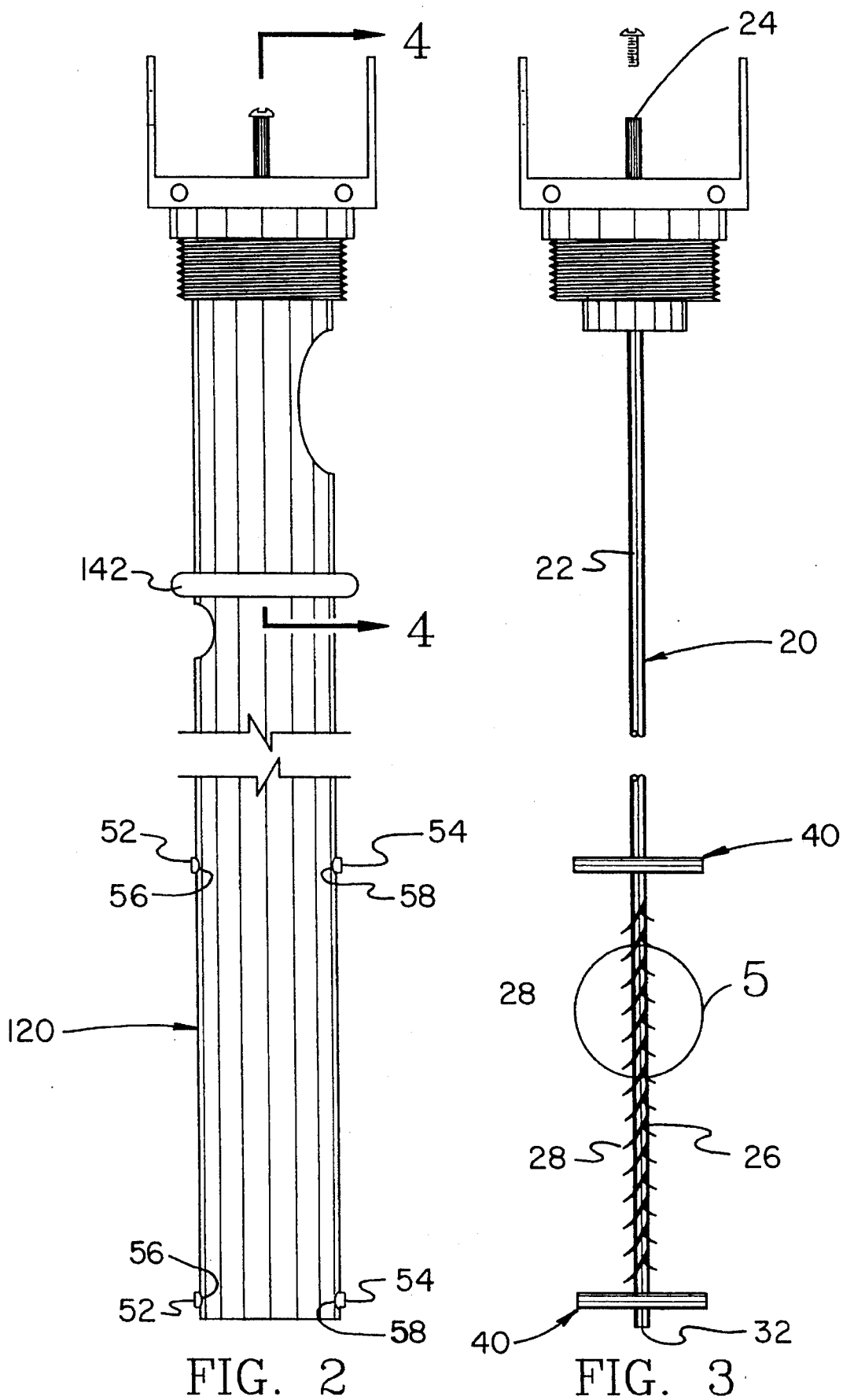

FLUID IONIZER

BACKGROUND OF THE INVENTION

1. Field of the Invention

The present invention relates to fluid filters and more particularly pertains to a fluid ionizer which may be adapted for causing particulate impurities within a fluid to cluster together to form larger particles which may be more easily filtered by subsequent conventional mechanical processes.

2. Description of the Prior Art

The use of fluid filters is known in the prior art. More specifically, fluid filters heretofore devised and utilized for the purpose of removing impurities from fluids are known to consist basically of familiar, expected and obvious structural configurations, notwithstanding the myriad of designs encompassed by the crowded prior art which have been developed for the fulfillment of countless objectives and requirements.

The present invention is directed to improving devices for removing impurities from fluids in a manner which is safe, secure, economical and aesthetically pleasing.

Relevant prior art patents include U.S. Pat. Nos. 5,234,555 and 4,902,391, both to Ibbott, which respectively disclose a method and apparatus for ionizing fluids utilizing a capacitive effect and a method and device for ionizing fluid.

The prior art also discloses a finite particle removal system as shown in U.S. Pat. No. 5,149,422 to Barrington, a method for separating ions from liquids in U.S. Pat. No. 5,061,376 to MacGregor, and an apparatus and method for filtering particular matter from dielectric fluids of U.S. Pat. No. 4,961,845 to Dawson et al.

While these devices fulfill their respective, particular objectives and requirements, the aforementioned patents do not disclose a fluid ionizer for causing particulate impurities within a fluid to cluster together to form larger particles which may be more easily filtered by subsequent conventional mechanical processes which utilizes an ionizing comb electrode having a plurality of pointed prongs. Furthermore, none of the prior art fluid filters teach or suggest a method of charging a high-field electrode with high frequency high voltage negative pulses.

In this respect, the fluid ionizer according to the present invention substantially departs from the conventional concepts and designs of the prior art, and in so doing provides an apparatus primarily developed for the purpose of causing particulate impurities within a fluid to cluster together to form larger particles which may be more easily filtered by subsequent conventional mechanical processes.

Therefore, it can be appreciated that there exists a continuing need for a new fluid ionizer which can be used for causing particulate impurities within a fluid to cluster together to form larger particles which may be more easily filtered by subsequent conventional mechanical processes. In this regard, the present invention substantially fulfills this need.

As illustrated by the background art, efforts are continuously being made in an attempt to develop devices for removing impurities from fluids. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of fluid filters now present in the prior art, the present invention provides a new fluid filter construction wherein the same can be utilized for causing particulate impurities within a fluid to cluster together to form larger particles which may be more easily filtered by subsequent conventional mechanical processes. As such, the general purpose of the present invention, which will be described subsequently in greater detail, is to provide a new fluid ionizer apparatus and method which has all the advantages of the prior art fluid filters and none of the disadvantages.

The invention is defined by the appended claims with the specific embodiment shown in the attached drawings. For the purpose of summarizing the invention, the invention may be incorporated into a new fluid ionizer for use within a generally vertically oriented dielectric conduit through which a fluid containing naturally positively charged particulate impurities is flowing from top to bottom. The ionizer causes the impurities to cluster together to form larger particles which may be more easily filtered by subsequent conventional mechanical processes.

The fluid ionizer comprises an elongated hollow electrically grounded first electrode disposed within the conduit and through which fluid flowing in the conduit also flows. The first electrode is formed of 2 inch O.D. brass tube to conform to an existing 2 inch I.D. conduit for fitting tightly therein. The first electrode has a lower open end defining a fluid output port. The first electrode further has an upper fluid input port and a fluid overflow port through a wall thereof intermediate the input port and the output port. The output port, input port, and overflow port are aligned with existing output, input, and overflow apertures formed in the conduit.

A resilient rubber O-ring seal is disposed between an inner wall surface of the conduit and an outer wall surface of the first electrode intermediate the input and overflow ports. Fluid backing up within the conduit is prevented from flowing out the input port by the seal, but rather flows out the overflow port into a holding tank communicating with the output and overflow ports.

An elongated second electrode has a plurality of pointed prongs projecting generally laterally therefrom to define an ionizing comb. The second electrode is coaxially positioned within the first electrode such that the fluid flowing through the first electrode also flows amongst the prongs of the ionizing comb. The second electrode is negatively charged with a high frequency series of high voltage pulses whereby, in combination with the first electrode, the second electrode, and more particularly the points of the ionizing comb, impart a negative charge to some of the particles within the fluid flowing past. The negatively charged particles attract the remaining naturally positively charged particles such that clusters of particles are formed. Each cluster is larger and more easily filtered out of the fluid by subsequent conventional means than the original particles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new fluid ionizer for causing particulate impurities within a fluid to cluster together to form larger particles which may be more easily filtered by subsequent conventional mechanical processes.

It is another object of the present invention to provide a new fluid ionizer which may be easily and efficiently manufactured and marketed.

It is a further object of the present invention to provide a new fluid ionizer which is of a durable and reliable construction.

An even further object of the present invention is to provide a new fluid ionizer which is susceptible of a low cost of manufacture with regard to both materials and labor, and which accordingly is then susceptible of low prices of sale to the consuming public, thereby making such fluid ionizers economically available to the buying public.

Still yet another object of the present invention is to provide a new fluid ionizer which provides in the apparatuses and methods of the prior art some of the advantages thereof, while simultaneously overcoming some of the disadvantages normally associated therewith.

Still yet another object of the present invention is to provide a new fluid ionizer which consumes a relatively small amount of power.

Yet another object of the present invention is to provide a new fluid ionizer which is more efficient than conventional ionizers which use plates or rods for electrodes because of the corona effect resulting from the pointed ionizer comb prongs.

Even still another object of the present invention is to provide a new fluid ionizer that requires only minimal maintenance over its entire useful life.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a segmented side elevational view of the invention of FIG. 1 shown without the junction box cover.

FIG. 3 is a side elevational view of the invention of FIG. 2 shown without the first electrode and O-ring.

DESCRIPTION OF THE PREFERRED EMBODIMENT

Figure 1:
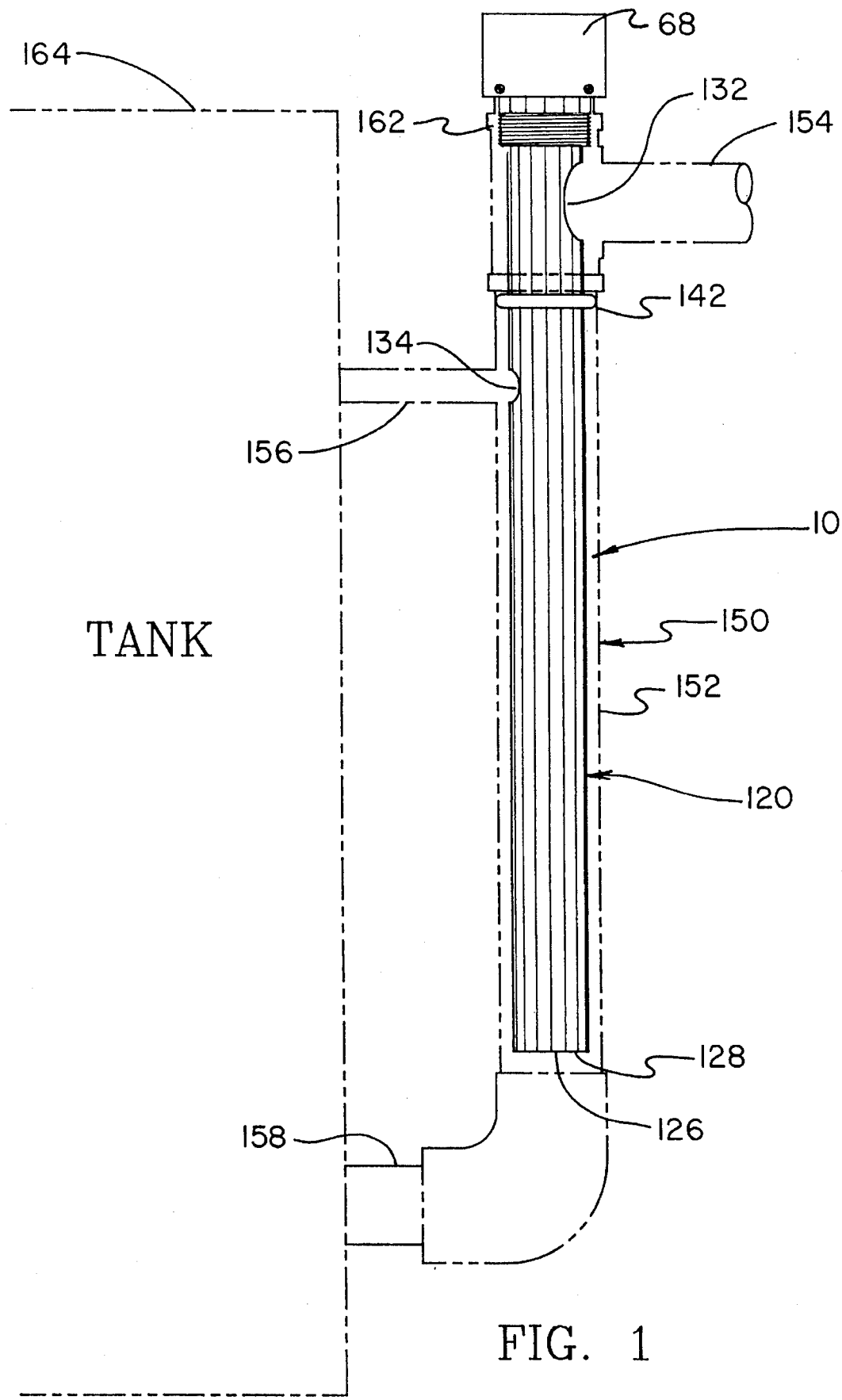
FIG. 1 is a side elevational view of the preferred embodiment of the present fluid ionizer with the existing conduit and holding tank being shown with phantom lines.
Figures 4, 5:
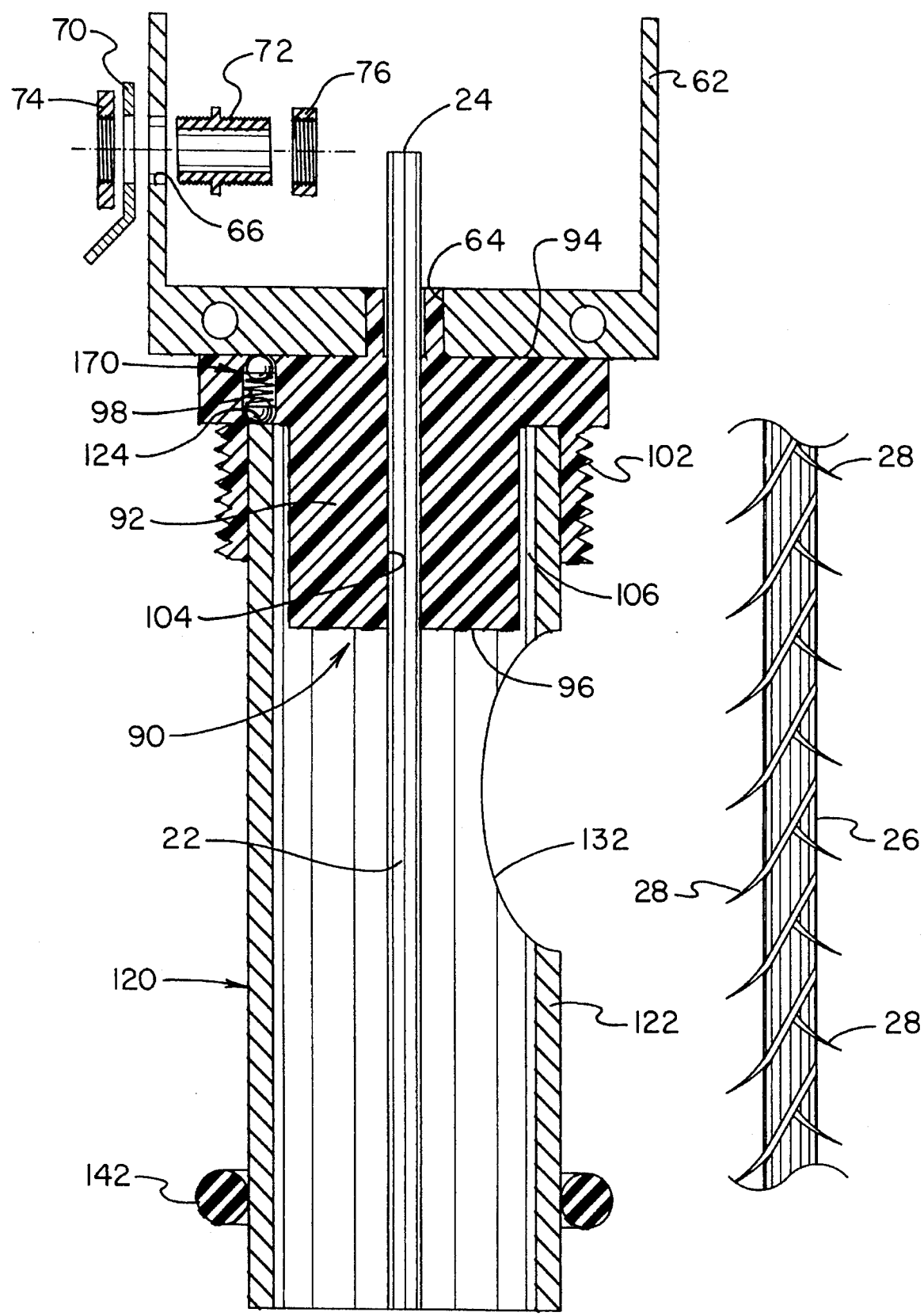
FIG. 4 is a sectional view of the invention of FIG. 2 taken along the line 4—4 with the feed-through bushing added.
FIG. 5 is a partial enlarged view of the invention of FIG. 3 detailing the manner of construction of the ionizing comb.
Figure 6:
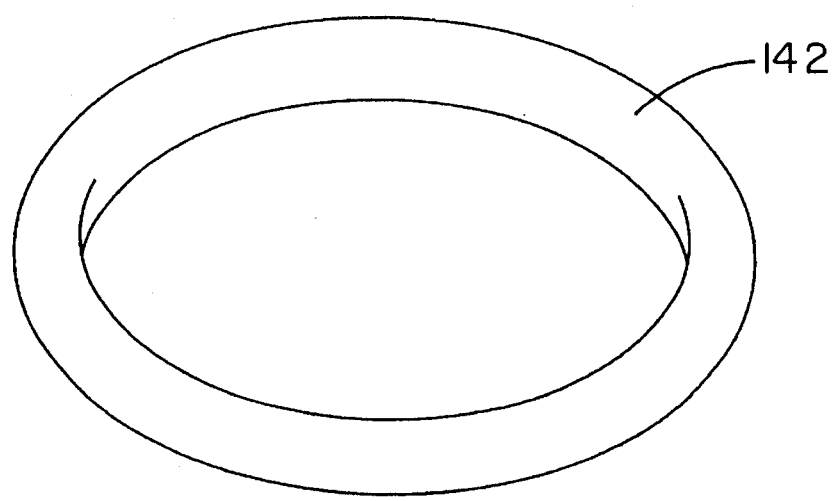
FIG. 6 is a top perspective view of the O-ring.
Figure 7:
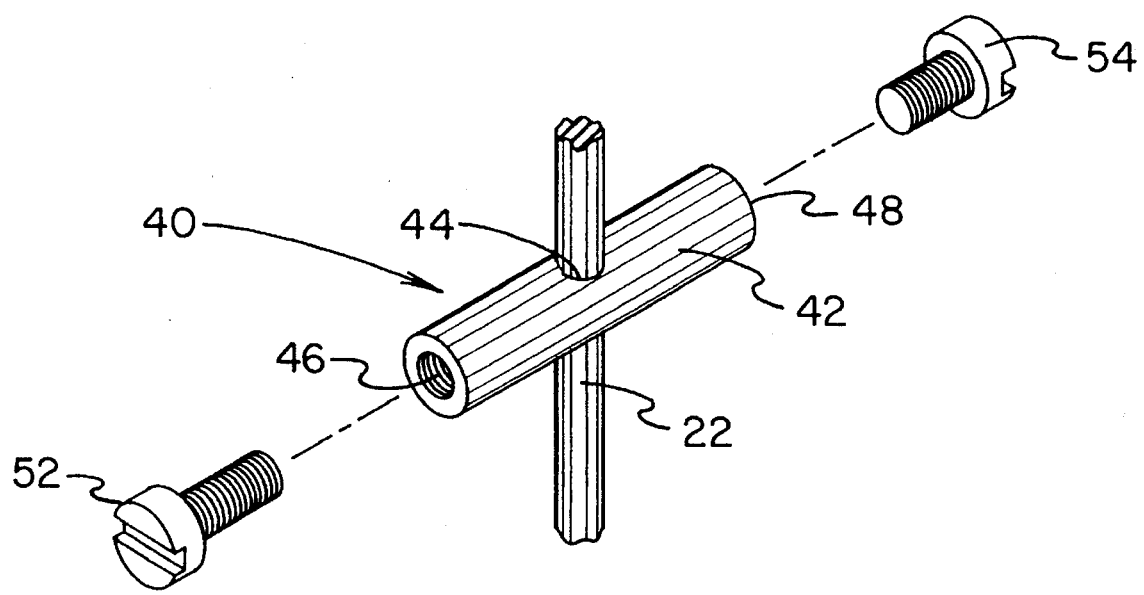
FIG. 7 is a partial enlarged view of the invention of FIG. 3 detailing the manner of construction of the insulating standoffs, with the insulating screws added.

With reference now to the drawings, and in particular to FIG. 1 thereof, a new fluid ionizer embodying the principles and concepts of the present invention and generally designated by the reference numeral 10 will be described.

From an overview standpoint, the fluid ionizer is adapted for use within a generally vertically oriented dielectric conduit through which a fluid containing naturally positively charged particulate impurities is flowing from top to bottom. The ionizer causes the impurities to cluster together to form larger particles which may be more easily filtered by subsequent conventional mechanical processes. See FIG. 1.

With reference now to FIGS. 1–7 and more specifically, it will be noted that a new fluid ionizer 10 is shown. The fluid ionizer 10 comprises an elongated hollow electrically grounded first electrode 120 disposed within the conduit 150 and through which fluid flowing in the conduit also flows. The first electrode 120 is formed of 2 inch O.D. brass tube to conform to an existing 2 inch I.D. conduit 152 for fitting tightly therein. The first electrode 120 also has upper and lower open ends 124 and 126, the lower open end 126 defining a fluid output port 128. The first electrode 120 further has a fluid input port 132 through a wall 122 thereof proximal the upper end 124 thereof and a fluid overflow port 134 through the wall 122 thereof intermediate the input port 132 and the output port 128. The output port 128, input port 132, and overflow port 134 are aligned with existing output 158, input 154, and overflow 156 apertures formed in the conduit 150.

A resilient rubber O-ring seal 142 is disposed between an inner wall surface of the conduit 150 and an outer wall surface of the first electrode 120 intermediate the input and overflow ports 132 and 134. In operation, fluid backing up within the conduit 150 is prevented from flowing out the input port 132 by the seal 142, but rather flows out the overflow port 134 into a holding tank 164 communicating with the output and overflow ports 128 and 134.

An elongated second electrode 20 has a plurality of pointed prongs 28 projecting generally laterally from a second electrode rod 22 to define an ionizing comb 26. The second electrode 20 is coaxially positioned within the first electrode 120 such that the fluid flowing through the first electrode also flows amongst the prongs 28 of the ionizing comb 26.

The second electrode 20 is precluded from contacting the first electrode 120 with a pair of spaced apart insulating standoffs 40 extending transversely across the inside of the first electrode 120. The second electrode rod 22 extends through a medial lateral hole 44 through each of the standoff bodies 42 which prevents the second electrode 20 from lateral movement relative the first electrode 120. Each standoff 40 is secured within the first electrode 120 by a pair of screws 52 and 54 formed of dielectric material extending through a pair of opposing holes 56 and 58 through the wall 122 of the second electrode 120. Each screw 52 and 54 is also threadedly engaged with a threaded axial bore 46 and 48 formed in each end of the standoff body 42.

The second electrode 20 is negatively charged with a high frequency series of high voltage pulses whereby, in combination with the first electrode 120, the second electrode 20, and more particularly the points of the ionizing comb 26, impart a negative charge to some of the particles within the fluid flowing past. The negatively charged particles attract the remaining naturally positively charged particles such that clusters of particles are formed. Each cluster is larger and more easily filtered out of the fluid by subsequent conventional means than the original particles.

An electrical junction box 62 formed of conductive material and having a removable cover 68 is mounted to the upper end 124 of the first electrode 122 by means of a plug 90 extending downwardly from the bottom of the box. The plug 90 comprises a dielectric plug body 92 having a circular groove 106 concentrically formed in the bottom 96 thereof. The upper end 124 of the first electrode extends into the groove 106 and is fixedly fluid-tightly connected therein. A first bore 98 extends longitudinally through the plug body 92, communicating at one end with the circular groove 106 and at the other end with the top 94 of the plug body. An elongated longitudinally spring biased electrical feedthrough connector 170 extends through the first bore 98 such that the first electrode 120 is in electrical contact with the junction box 62. External threads 102 are formed on the plug body for fluid-tight engagement with cooperative internal threads 162 formed in the conduit 150.

The upper end 24 of the second electrode 20 extends through an axial second bore 104 formed through the plug body 92, the electrode being frictionally engaged therein to provide a fluid-tight seal. The electrode 20 also extends through a hole 64 through the bottom of the junction box 62 to project slightly into the junction box 62 for facilitating making electrical connection thereto. The hole 64 through the junction box is oversize to prevent the box 62 from coming into electrical contact with the second electrode 20.

A feedthrough bushing 72 extends through a hole 66 in a side of the junction box 62 wherethrough a cable carrying the high voltage pulses may extend for connection to the upper end 24 of the second electrode 20. The feedthrough bushing also extends through the mounting hole of an electrical lug 70, the bushing 72 and lug 70 being fastened to the box 62 with nuts 74 and 76. The lug 70 may be used to establish an electrical ground connection between the first electrode 120 and an external grounding lead.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A fluid ionizer for use within a generally vertically oriented dielectric conduit through which a fluid containing naturally positively charged particulate impurities is flowing from top to bottom for causing the impurities to cluster together to form larger particles which may be more easily filtered by subsequent conventional mechanical processes, the fluid ionizer comprising:

an elongated hollow tubular metal first electrode having an inner wall surface and an outer wall surface and adapted to be disposed within the conduit, and through which fluid flowing in the conduit also flows, the first electrode having a cross sectional shape generally conforming to the inside shape of the conduit within which it is to be disposed for fitting tightly therein, the first electrode also having a lower open end defining a fluid output port, the first electrode further having an upper fluid input port and a fluid overflow port, the overflow port being an opening extending from the inner wall surface to the outer wall surface intermediate the input port and output port, the output port, input port, and overflow port being located so as to be aligned with existing output, input, and overflow apertures formed in the conduit;

a seal surrounding the first electrode at a location intermediate the input and output ports and adapted to be disposed between an inner wall surface of the conduit and the outer wall surface of the first electrode whereby fluid backing up within the conduit is prevented from flowing out the input port but rather flows out the overflow port into a holding tank communicating with the output and overflow ports;

an elongated second electrode having a plurality of pointed prongs projecting generally laterally therefrom to define an ionizing comb, the second electrode being coaxially positioned within the first electrode with a pair of spaced apart insulating standoffs secured to the first electrode and further extending across the full radial extent thereof such that the fluid flowing through the first electrode also flows amongst the prongs of the ionizing comb, whereby when the second electrode is negatively charged with a high frequency series of high voltage pulses in combination with the first electrode, the points of the ionizing comb impart a negative charge to some of the particles within the fluid flowing past, and the negatively charged particles attract the remaining naturally positively charged particles such that clusters of particles are formed, each cluster being larger and more easily filtered out of the fluid by subsequent conventional means than the original particles; and an electrical junction box mounted to the upper end of the first electrode wherein an electrical connection may be formed between the first electrode and an external grounding lead, the junction box also facilitating an electrical connection between the second electrode and an external supply cable carrying high voltage pulses.

\* \* \* \* \*